(12) United States Patent
Jordan et al.

(10) Patent No.: US 10,272,935 B1
(45) Date of Patent: Apr. 30, 2019

(54) HAND CART FOR LIFTING AND SUPPORTING AN ITEM FOR HOLDING WINDABLE MATERIAL AND ASSOCIATED METHOD

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 292 days.

(21) Appl. No.: 15/330,344

(22) Filed: Sep. 8, 2016

(51) Int. Cl.
 *B62B 1/14* (2006.01)
 *B62B 1/26* (2006.01)
 *B62B 1/00* (2006.01)
 *B65H 49/38* (2006.01)

(52) U.S. Cl.
 CPC ............... *B62B 1/14* (2013.01); *B62B 1/008* (2013.01); *B62B 1/264* (2013.01); *B65H 49/38* (2013.01); *B62B 2202/025* (2013.01); *B62B 2203/00* (2013.01); *B62B 2206/006* (2013.01)

(58) Field of Classification Search
 CPC ........... B62B 1/14; B62B 1/008; B62B 1/264; B62B 2202/025; B65H 49/38
 See application file for complete search history.

(56) References Cited

U.S. PATENT DOCUMENTS

| | | | | |
|---|---|---|---|---|
| 2,705,114 | A * | 3/1955 | Worsham | B62B 1/264 242/594.4 |
| 3,856,230 | A * | 12/1974 | Zimmer | B62B 1/22 242/422.8 |
| 4,564,152 | A * | 1/1986 | Herriage | B65H 49/32 242/422.4 |
| 5,109,882 | A * | 5/1992 | Eley | B65H 75/403 137/355.21 |
| 5,285,981 | A * | 2/1994 | Pavelka | B65H 49/32 24/610 |
| 8,403,250 | B1 * | 3/2013 | Callahan | B65H 75/403 137/355.26 |
| 8,931,724 | B2 | 1/2015 | Jordan et al. | |
| 9,187,289 | B1 | 11/2015 | Jordan et al. | |

* cited by examiner

*Primary Examiner* — Sang K Kim
(74) *Attorney, Agent, or Firm* — Michael E. McKee

(57) ABSTRACT

A hand cart and a method of use for lifting a spool of material from a floor includes a wheeled base and a spool-supporting rack section which includes a pair of parallel arm sections having two ends which extend forwardly of the cart. A pair of floor-engaging struts are joined to the arm sections adjacent the forwardly-extending ends thereof, and a pair of pillow blocks having a pair of axially-aligned openings are secured to the arm sections. By pivoting the cart forwardly about the struts from a first position at which the wheels engage the floor to a second position at which the wheels are elevated from the floor, then inserting an axle rod in sequence through one pillow block opening, through the barrel of the item and then through the other pillow block opening and then returning the cart to the first position, the item is lifted above the floor.

16 Claims, 10 Drawing Sheets

HAND CART FOR LIFTING AND SUPPORTING AN ITEM FOR HOLDING WINDABLE MATERIAL AND ASSOCIATED METHOD

BACKGROUND OF THE INVENTION

This invention relates generally to means and methods for lifting and transporting an item from one site to another and relates, more particularly, to a wheeled accessory and a method of use which is well-suited for lifting an item, such as a spool, for holding windable material from an underlying floor for purposes of supporting the item above the floor or for transporting the item across the floor.

An item, such as a spool, for holding windable material capable of being lifted and supported by an accessory of the class with which this invention is concerned commonly includes a hollow barrel about which a length of windable material, such a wire or cable, can be wound or from which a windable material can be unwound. In addition and in order for the item to be lifted by an accessory with which this invention is concerned, the item is positioned upon an underlying floor so that the barrel of the item is oriented substantially parallel to the floor.

There exists hand carts which have a pair of axially-aligned wheels and a pair of substantially parallel arms which are spaced apart by a distance which is st least as great as the thickness of the spool or, stated another way, the length of the spool barrel. By positioning a rod through the barrel so that the portions of the rod extend from the barrel at each end thereof, and then manually manipulating such a cart into place about the item so that the pair of arms of the cart are disposed at the opposite ends of the item and then leaning the cart rearwardly (i.e. so that the body of the cart pivots about its axially-aligned wheels and generally away from the item), the arms are permitted to engage the portions of the rod which extend away from the spool end from the underside thereof and lift the item from the floor. Once lifted above the floor, the item can be held in its elevated condition by a user of the cart or wheeled by the user to an alternative site.

It would be desirable to provide a new and improved wheeled hand cart which is capable of being used to lift an item for holding windable material from a floor without the need that the user hold the cart in place and for moving the item from one site to another.

Accordingly, it is an object of the present invention to provide a new and improved hand cart for lifting an item for holding windable material from a floor and for moving the item from one site to another.

Another object of the present invention is to provide such a hand cart whose design enables a user to lift and support an item of considerable weight from the floor.

Still another object of the present invention is to provide such a hand cart which enables the item to be supported above the floor for purposes of unwinding a windable material from the barrel of the item or for purposes of winding a windable material about the barrel of the item without requiring that the user of the cart hold the cart in place.

Yet another object of the present invention is to provide such a hand cart whose versatility of design accommodates the support of a plurality of items in an elevated condition above the floor.

A further object of the present invention is to provide such a hand cart having a reel component about which a windable material can be wound.

A still further object of the present invention is to provide such a hand cart which is uncomplicated in structure, yet effective in operation.

SUMMARY OF THE INVENTION

This invention resides in a hand cart and associated method of use for lifting an item for holding windable material from a floor wherein the item includes an elongated barrel having two opposite ends and about which the material is wound and the item is arranged so that the barrel of the item is oriented substantially parallel to the floor.

The hand cart of the invention includes a base including a first elongated section which is arranged substantially horizontally and which includes two opposite ends and a second elongated section which includes two opposite ends and which is joined at one of its two opposite ends to the first elongated section and is arranged with respect thereto so that the other of the two opposite ends of the second elongated section is directed generally upwardly from the first elongated section, and the base also includes at least one hand grip which is associated with the other of the two opposite ends of the second elongated section. In addition, a pair of floor-engaging wheels are supported at the opposite ends of the first elongated section of the base for rotation relative thereto about a common rotational axis. An item-supporting rack section is joined to the base and includes a pair of substantially parallel arm sections wherein each arm section has an end which extends forwardly of the cart, and the item-supporting rack section further includes a pair of floor-engaging struts which are each joined to a corresponding arm section adjacent the forwardly-extending end thereof so as to extend substantially downwardly therefrom. The cart also includes cooperating means associated with the arm sections of the rack section for cooperating with the barrel of the item so that when the item is supported in an elevated condition above the floor by the hand cart, the weight of the item is borne by the cooperating means. Moreover, the associated means is disposed along the length of the arm sections rearwardly of the forwardly-extending ends of the arm sections yet forwardly of the common rotational axis of the wheels of the cart, and the cooperating means is disposed at a higher elevation from the floor than is the barrel of the item desired to be lifted with the cart so that by positioning the cart adjacent the item so that the barrel of the item extends between the arm sections of the rack section, then pivoting the cart forwardly about the floor-engaging struts from a first position at which the wheels and the floor-engaging struts engage the floor to a second position at which the wheels are elevated from the floor, positioning the cooperating means in cooperating relationship with the barrel of the item, and then pivoting the cart rearwardly about the floor-engaging struts to the first position at which the wheels re-engage the floor, the item is lifted to an elevated condition above the floor.

The method of the invention includes the steps involved in using the hand cart of the invention. In particular, such steps include the providing of the hand cart of the invention and then positioning the cart adjacent the item so that the barrel of the item extends between arm sections of the rack section. The cart is then pivoted forwardly about the floor-engaging struts from a first position at which the wheels and the floor-engaging struts engage the floor to a second position at which the wheels are elevated from the floor, and the cooperating means are positioned in cooperating relationship with the barrel of the item. The cart is thereafter pivoted rearwardly about the floor-engaging struts to the first position at which the wheels re-engage the floor and so that the item is lifted to an elevated condition above the floor.

DETAILED DESCRIPTION OF AN ILLUSTRATIVE EMBODIMENT

Figure 1:
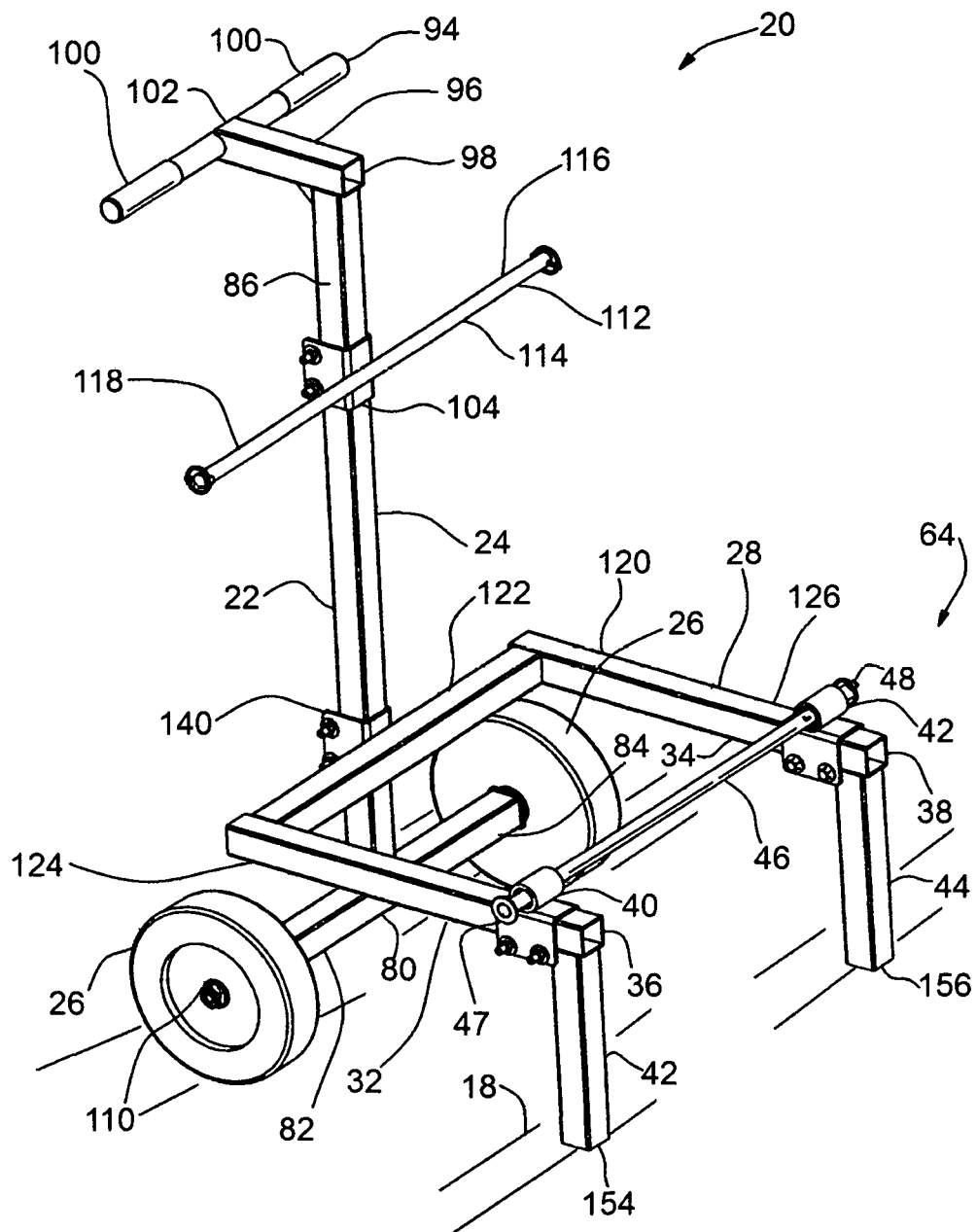
FIG. 1 is a perspective view of an embodiment of a wheeled hand cart within which features of the present invention are embodied.

Turning now to the drawings in greater detail and considering first FIG. 1, there is illustrated an embodiment of a hand cart, generally indicated 20, within which features of the present invention are embodied shown positioned upon an underlying floor 18. The hand cart 20 includes a base 22 having a somewhat T-shaped base section 24 and a pair of floor-engaging wheels 26, 26 which are rollably attached to the base section 24. The hand cart 20 also includes an item-supporting rack section 28 disposed forwardly of the base 22.

The rack section 28 includes a pair of elongated sections 32, 34 having spaced-apart ends 36, 38, respectively, which are positionable on opposite sides of an item desired to be lifted with the cart 20 and also includes a pair of floor-engaging struts 42, 44 which depend downwardly of the elongated sections 32, 34 adjacent the ends 36, 38 thereof. In addition, the cart 20 includes cooperating means, generally indicated 64 in FIG. 1, which are associated with the arm sections 32, 34 for cooperating with an item to be lifted with the cart 20 so that when the item is supported in an elevated condition above the floor 18 by the cart 20, the weight of the item is borne through the cooperating means 64. Within the depicted embodiment 20, the cooperating means 64 includes a pair of opening-providing pillow blocks 40 which are secured atop the elongated sections 32, 34 adjacent the ends 36, 38 thereof and an axle rod 46 which extends through the pillow blocks 40 so as to span the space therebetween. As will be apparent herein and within the depicted embodiment 20, when an item is supported by the hand cart 20, the weight of the item is borne through the axle rod 46 and pillow blocks 40.

Within the depicted embodiment 20, the elongated sections 32, 34 of the rack section 28 of the depicted cart 20, as well as those of the base 22, are constructed of steel having a substantially square in cross section. It will be understood, however, that other materials which can possess an alternative cross-sectional shape, can be used.

Figure 2:
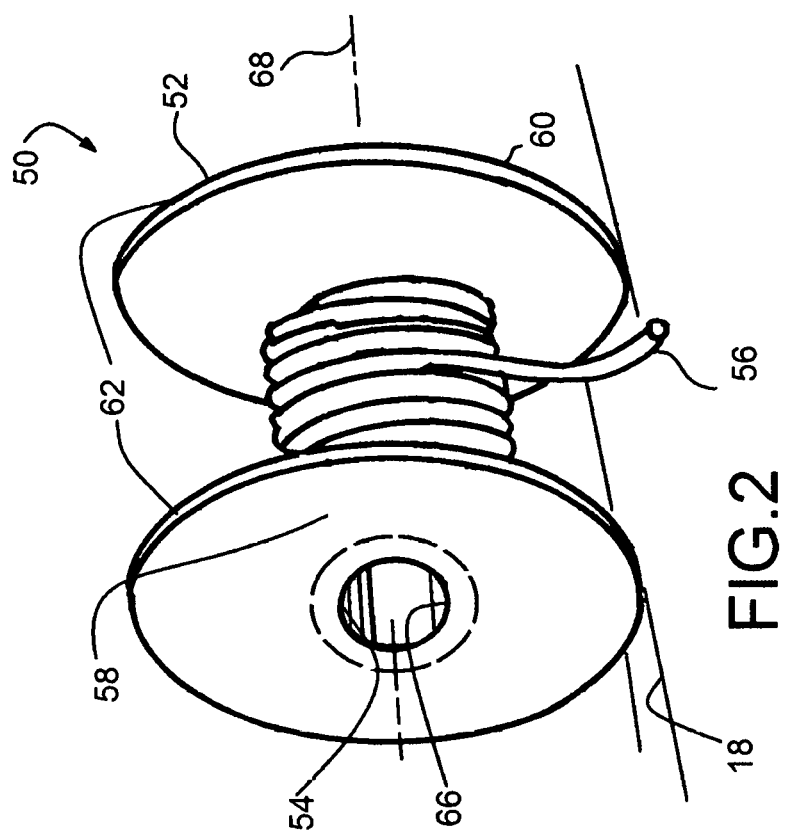
FIG. 2 is a perspective view of an exemplary item, or spool, of a class which is capable of being lifted and transported by the hand cart of FIG. 1.

With reference to FIG. 2, there is illustrated an item, generally indicated 50, of a class of items which can be lifted and transported with the hand cart 20. The depicted item 50 of FIG. 2 is in the form of a spool 52 which includes an elongated barrel 54 about which a length of coiled material 56, such as electrical wire, steel cable or rope, is wound and includes a pair of planar disc-like flanges 58, 60 attached to the opposite ends of the barrel 54. Each flange 58 or 60 of the depicted spool 52 is circular in form and defines a cylindrical rim 62 along its peripheral edge. Furthermore, there is commonly provided a hollow bore 66 which extends through the center of both flanges 58, 60 and the elongated barrel 54. In addition, the bore 54 defines an elongated axis 68 about which the spool 52 can be rotated (e.g. for purposes of unwinding material from the spool 52) as the spool 52 is supported above the floor 18 by way of the hand cart 20.

For purposes of lifting the spool 52 from the underlying floor 18 by way of the hand cart 20, the spool 52 is arranged upon the floor 18 so that the plane of each disc-like flange 58 or 60 of the spool 52 is arranged substantially vertically. That is to say, the spool 52 is arranged upon the floor 18 so that the rims 62 of both flanges 58, 60 engage the floor 18 and the barrel 54 of the spool 52 is oriented substantially parallel to the floor 18.

Figure 3:
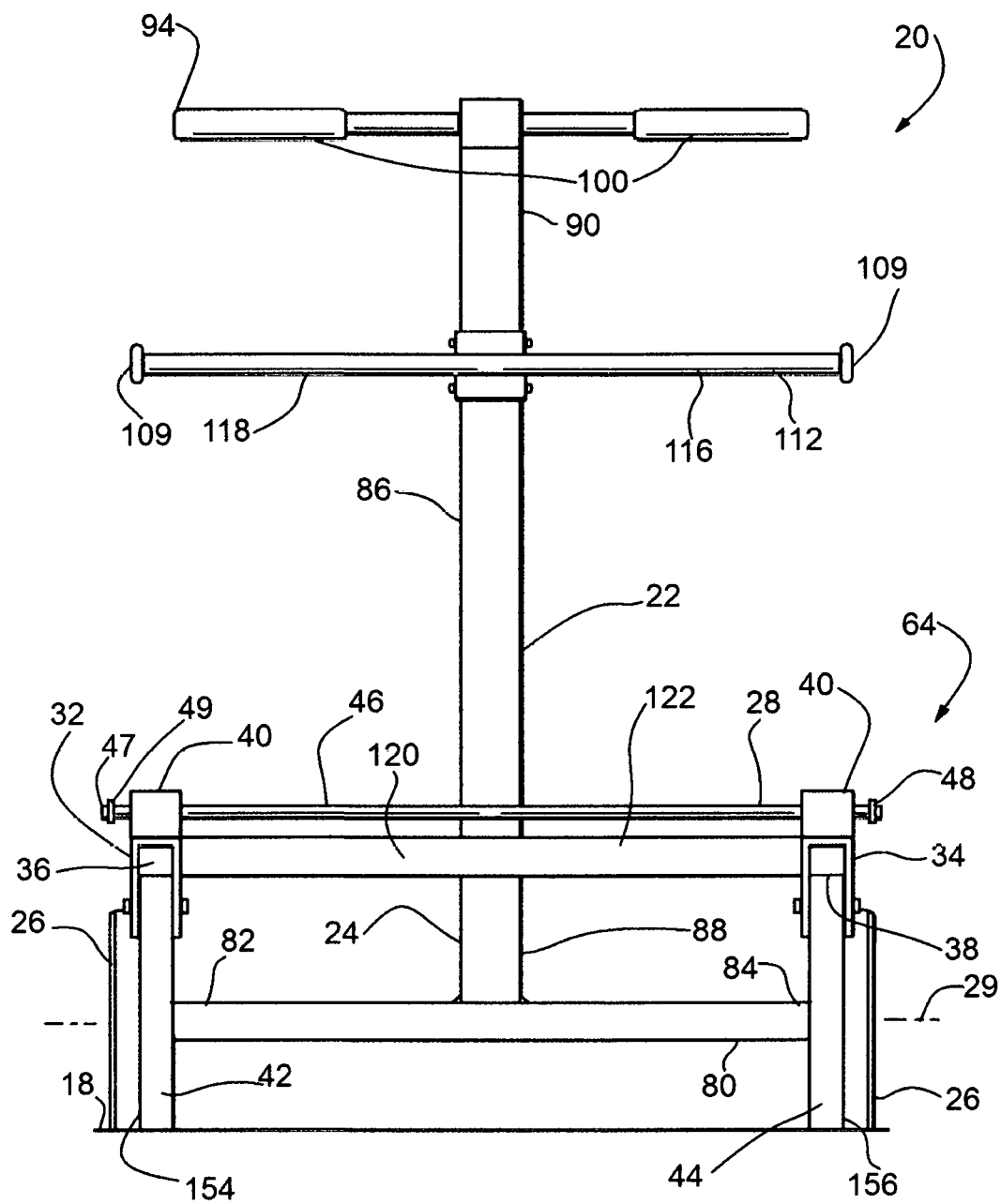
FIG. 3 is a front elevation view of the FIG. 1 cart as seen generally from the right in FIG. 1.
Figure 4:
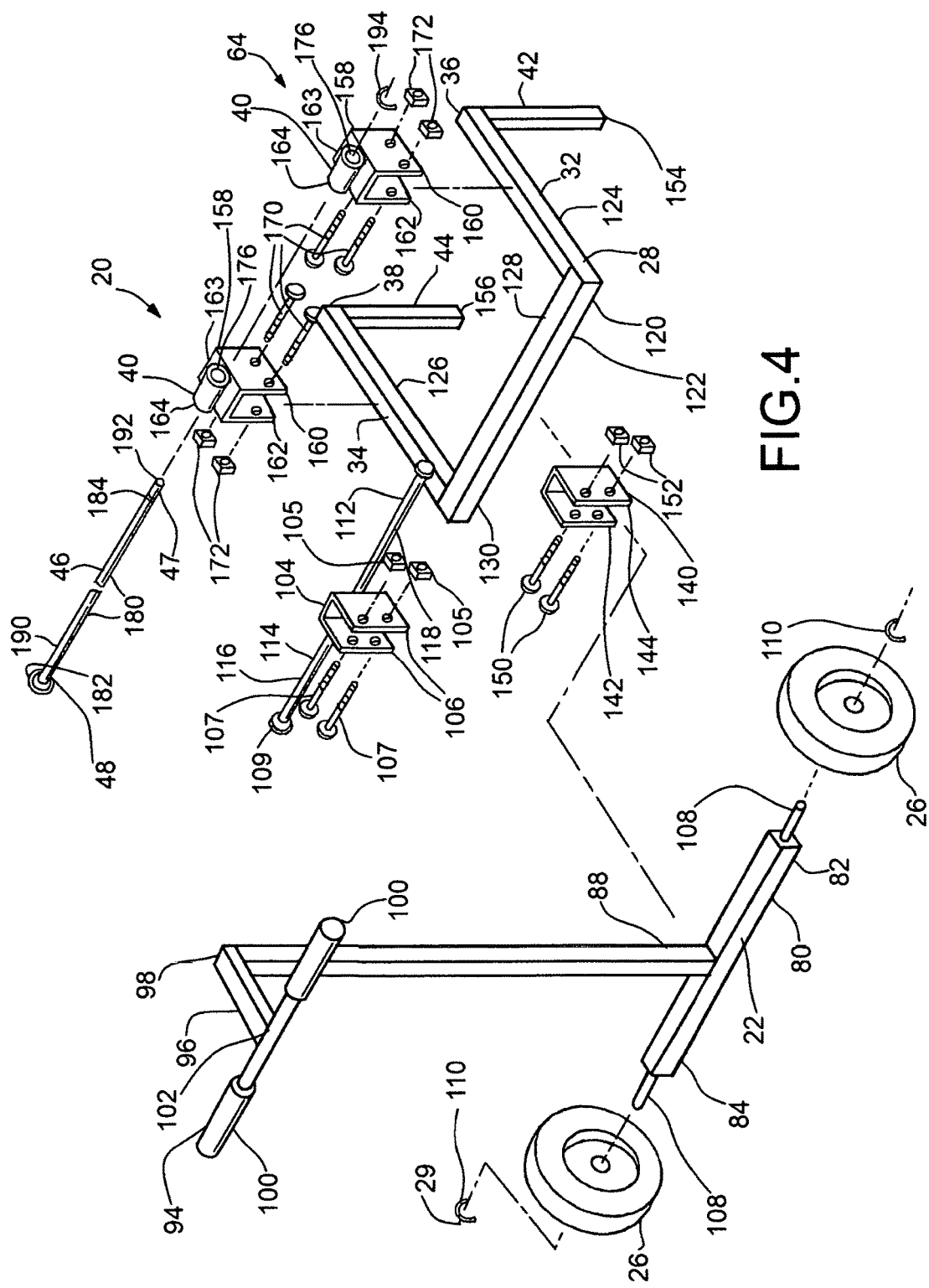
FIG. 4 is a perspective view of the FIG. 1 cart, shown exploded.

With reference to FIGS. 1, 3 and 4, the base section 24 of the base 22 includes a first elongated section 80 which is arranged substantially horizontally above the floor 18 and defines two opposite ends 82, 84 and a second elongated section 86 which defines two opposite lower and upper ends 88, 90, respectively. One end 88 of the second elongated section 86 is joined (e.g. welded) to the first elongated section 80 at a location thereon which is disposed substantially midway between the opposite ends 82, 84 of the first elongated section 80 and is arranged with respect to the first elongated section 80 so that the upper end 90 of the second elongated section 86 extends substantially upwardly from the first elongated section 80. Thus and as best shown in FIG. 4, the shape of the joined first and section elongated sections 80 and 86 resembles an inverted T.

With reference still to FIG. 4, the base 22 also includes a handle section 94 having an elongated portion 96 which is joined at one end, indicated 98, (i.e. the forward end) to the second elongated section 86 at the (upper) end 90 thereof so as to extend horizontally therefrom and rearwardly with respect to the remainder of the cart 20. The handle section 94 also includes a pair of grips 100 which are joined to the strut portion 96 at the end, indicated 102, (i.e. the rearward end) thereof so as to extend horizontally away from the opposite sides of the cart 20. It follows that the pair of grips 100 are capable of being grasped by the hands of a user for manually manipulating or moving the cart 20 in a desired manner. In addition and as will be apparent herein, the disposition of the hand grips 100 rearwardly of the remainder of the cart 20 enhances the mechanical advantage gained by a user as he manipulates, or pivots, the cart 20 about its wheels 26.

The base section 22 also includes a rod assembly 112 having a rod 114 whose end portions 116, 118 extend outwardly of (i.e. away from the sides of) the cart 20. The rod 114 is secured to the elongated section 86 of the cart 20 in a substantially horizontal orientation by way of a bracket 104 which is joined (e.g. welded) to the rod 114 medially of the end portions 116, 118 thereof. The rod assembly 112 also includes a pair of side plates 106 which are sandwiched about the sides of the elongated section 86 and held thereagainst with nuts 107 and bolts 108 which extend through aligned openings provided in the side plates 106. As will be apparent herein, the end portions 116, 118 of the rod 114 can be used to support an item, such as a spool of relatively small diameter, in an elevated condition above the floor 18, and are preferably provided with a head or retainer key 109 at the ends thereof which help to retain an item which is positioned upon the end portion 116 or 118.

As best shown in FIG. 4, each wheel 26 is supportedly attached to the first elongated section 80 at a corresponding end of the first elongated section 80 for rotation with respect thereto. Each wheel 26 includes an internally-mounted bearing having a central opening for securement about a shank 108 which extends from the corresponding end 82 or 84 of the first section 80. A retainer key 110 is securable about the shank 108 so that each wheel 26 is maintained about the shank 108 between the corresponding end 82 or 84 of the first elongated section 80 and the retainer key 110. In addition, the wheels 26, 26 are arranged so that the rims thereof are substantially parallel to one another and so that the rotational axes thereof are aligned with one another. In other words, the wheels 26 are adapted to rotate about a common rotational axis 29 (FIGS. 3 and 4).

With reference still to FIGS. 1, 3 and 4, the item-supporting rack section 28 includes a substantially U-shaped portion 120 which is arranged so that the plane of its U-shape is oriented substantially horizontally. The U-shaped portion 120 includes a transversely-extending section 122 and two arm sections 124, 126 which are fixedly joined, as by welding, at one end thereof to the opposite ends, indicated 128, 130, of the transversely-extending section 122. In addition, the U-shaped portion 120 is arranged with respect to the remainder of the cart 20 so that the free ends of the arm sections 124, 126 of the U-shaped portion 120 are directed forwardly of the cart 20 (i.e. generally toward the right as viewed in FIGS. 1 and 4). It will be understood that the two arm sections 124, 126 of the U-shaped portion 120 provide the earlier-mentioned elongated sections 32, 34 of the rack section 28 and the free ends of the two arm sections 124, 126 provide the earlier-mentioned spaced-apart ends 36, 38 of the elongated sections 32, 34 which are positionable on opposite sides of the spool 52 desired to be lifted from the floor with the cart 20.

Meanwhile, each floor-engaging strut 42, 44 is joined (e.g. welded) to the arm sections 124, 126 at the free ends 36, 38 thereof so as to form a substantially right angle with the arm sections 124, 126 to which the strut 42 or 44 is joined and extends downwardly from the free end 36 or 38 to the underlying floor 18. It follows that the struts 42 and 44 are arranged in a substantially parallel relationship with one another.

The rack section 28 is securely joined to the base 22 of the cart 20 by way of a bracket 140 which is secured (e.g. welded) to the transversely-extending section 122 at a location therealong which is oriented substantially midway between the ends 128, 130 thereof. The bracket 140 is substantially U-shaped in cross section and has a pair of parallel side plates 142, 144 which provide the arms of the U-shape of the bracket 140 and which extend rearwardly of the cart 20. The side plates 142, 144 are arranged in such a relationship with one another so that the space therebetween closely accepts the second elongated section 86 when the spacing defined between the side plates 142, 144 is directed about the elongated section 86. The side plates 142, 144 further include pairs of aligned openings which are adapted to accept the shanks of bolts 150 inserted through the aligned openings 146 or 148. By inserting the shanks of the bolts 150 through the aligned openings 146, 148 and then threading a nut 152 about the threads of each bolt 150, the transversely-extending section 122 is securely held in position along the length of the second elongated section 86 as the side plates 142, 144 are clamped between the heads of the bolts 150 and the nuts 152.

Figure 5:
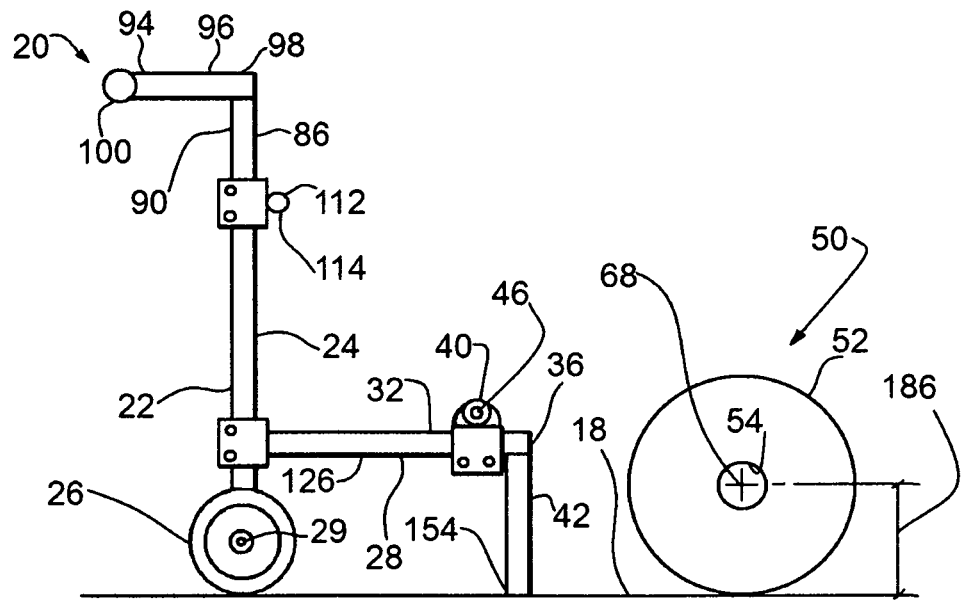
FIG. 5 is a side elevation view of the FIG. 1 cart as seen generally from the left in FIG. 1 and a spool desired to be lifted with the FIG. 1 cart.

It follows from the foregoing that when the rack section 28 is joined to the base 22 in the aforedescribed manner and the cart 20 is positioned in a first position (i.e. a position of rest), best shown in FIG. 5, so that the foot ends (i.e. the lower ends), indicated 154, 156 of the struts 42, 44 and both of the wheels 26 engage the underlying floor 18, both the transversely-extending section 122 and the arm sections 124, 126 of the rack section 28 are oriented substantially horizontally while the struts 42, 44 are oriented substantially vertically.

With reference again to FIG. 4, each pillow block 40 which is secured to the arm sections 124, 126 of the rack section 28 by way of a bracket 158 which includes a pair of side plates 160, 162 which are positionable on opposite sides of the arm section 124 or 126 to which the pillow block 40 is secured. The side plates 160, 162 extend downwardly from a base plate 163 to which a collar portion 164 is secured (e.g. welded) and define pairs of aligned openings through which the shanks of bolts 170 extend. By inserting the shanks of the bolts 170 through the aligned openings of the plates 160, 162 and then threading a nut 172 about the threads of each bolt 170, the pillow blocks 40 are securely held in position along the length of the arm section 124 or 126 as the side plates 160, 162 are clamped between the heads of the bolts 170 and the nuts 172. It follows that each pillow block 40 can be repositioned along the length of its corresponding arm section 124 or 126 by loosening the nuts 172 and bodily shifting (e.g. sliding) the pillow block 40 along the length of the arm section 124 or 126.

The collar portion 164 of each pillow block 40 includes an internal bearing having a central opening 176 through which the axle rod 46 is positionable. In this connection, the central opening 176 is sized to accept the axle rod 46 when the rod 46 is inserted endwise therethrough and is axially aligned with the central opening 176 of the other pillow block 40. Furthermore, the pillow blocks 40 are disposed along the length of the arm sections 124, 126 so that the axially-aligned openings 176 of the pillow blocks 40 are disposed along the length of the arm sections 124, 126 rearwardly of the struts 42, 44.

As best shown in FIG. 4, the axle rod 46 includes a shaft portion 180 having a head 182 at one end (indicated 190) thereof and an annular groove 184 at the other end (indicated 192) thereof. By inserting the axle rod 46 end 192—first in sequence through the central opening 176 of one pillow block 40 and then through the central opening 176 of the other pillow block 40, the shaft portion 180 extends and spans the space between the pillow blocks 40. By securing a retainer key 194 within the annular groove 184 defined at the rod end 192, the axle rod 46 is secured within the pillow blocks 40 between the head 182 of the axle rod 46 and the retainer key 194.

It is a feature of the hand cart 20 that when it is disposed in its aforedescribed FIG. 5 first position (at which both the wheels 26 and the lower ends 154, 156 of the struts 42, 44 rest upon the floor 18, the collar portions 164 or, more specifically, the aligned openings 176 thereof are elevated from the floor 18 by a height which is greater than the radius, indicated 186 in FIG. 5, of a spool 52 desired to be lifted and supported above the floor 18 by the cart 20. Stated another way, the elevation of the aligned openings 176 from the floor 18 is greater than the distance between the floor 18 and the elongated axis 68 of the barrel 54 of the spool 52 when the spool rests upon the floor 18 in the manner depicted in FIG. 5. This dimensional relationship between the cart 20 and the spool 52 helps to ensure that when the spool 52 is supported between the arm sections 124, 126 of the cart 20 by way of the axle rod 46, the rims 62 of the spool flanges 58, 60 are maintained in a spaced condition above the floor 18 so that the spool 52 is thereby free to rotate or be rotated about the longitudinal axis of the spool barrel 54 as material 56 is either wound about or unwound from the barrel 54 of the spool 52. In addition, the spaced distance between the axle rod 46 (when supported by the collar portions 164) and the transversely-extending section 122 of the rack section 28 is also greater than the radius 186 of the spool 152 to ensure that when the spool 52 is supported by the axle rod 46, the spool 52 is free to rotate about the axle rod 46 without interference from the transversely-extending section 122.

Figure 6:
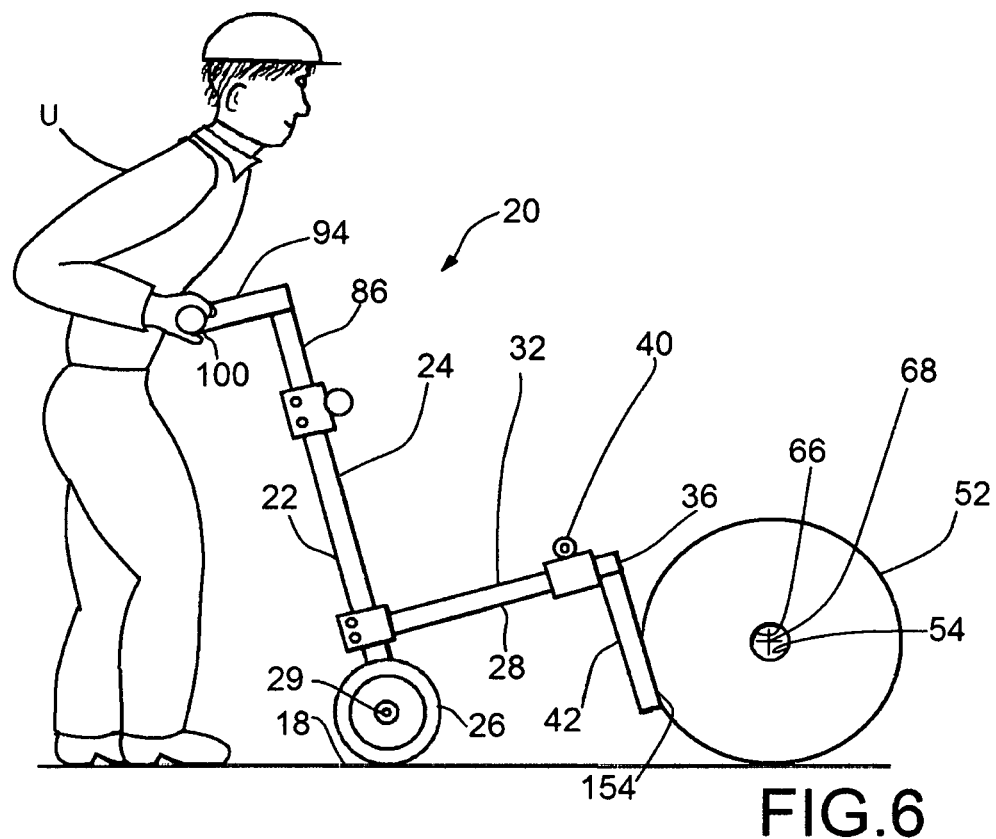
FIGS. 6-9 are views, similar to that of FIG. 5, illustrating sequential steps involved in lifting the spool of FIG. 5 from the floor and subsequently transporting the spool across the floor.

With reference to FIG. 6 and to use the hand cart 20 to lift a spool 52 thereof from the underlying floor 18, the axle rod 46 is first removed from the collar portions 164 and the user, indicated 190, assumes a standing position behind the cart 20 and grasps the grips 100 of the handle section 94. The user U then leans the cart 20 rearwardly (as the base section 24 is pivoted relative to the floor 18 about the aligned wheels 26) in order to lift the lower ends 154, 156 of the struts 42, 44 from the floor 18. The cart 20 is then advanced (i.e. pushed) into position adjacent, or with respect to, the spool 52 so that the arm sections 124, 126 are positioned on opposite sides of the flanges 58, 60 of the spool 52. That is to say, that the cart 20 is advanced toward the spool 52 until the spool 52 is accepted by the space defined between the forwardly-extending ends 36, 38 of the arm sections 124, 126. Upon advancing the cart 20 toward the spool 52 to a location at which the collar portions 164 are positioned alongside the rims 64 of the spool 52 (such as in the position of the cart 20 relative to the spool 52 depicted in FIG. 6), the cart 20 is returned to its FIG. 5 first position at which both the wheels 26 and the lower ends 154, 156 of the struts 42, 44 engage the floor 18.

The cart 20 is then leaned, or pivoted, forwardly by the user U relative to the floor 18 and about the lower ends 42, 44 to a second position (depicted in FIG. 7) at which the openings 176 of the collar portions 164 are positioned in registry, or axial alignment, with the hollow bore 66 of the barrel 54 of the spool 52. To this end, it may be necessary to manipulate, or re-orient, the cart 20 relative to the spool 52 so that the openings 176 of the collar portions 164 are axially aligned with the hollow bore 66 of the spool barrel 54. At that point and with reference to FIG. 7, the axle rod 46 is re-inserted through the aligned openings 176 of the collar portions 164 by directing the end 47 of the rod 46 in sequence through the collar portion opening 176 of one pillow block 40, then through the hollow bore 66 of the spool barrel 54 and then through the collar portion opening 176 of the other pillow block 40. The axle rod 46 is then secured in place through the collar portions 164 by positioning the retainer key 49 within the annular groove 184 defined at the rod end 47.

Figure 7:
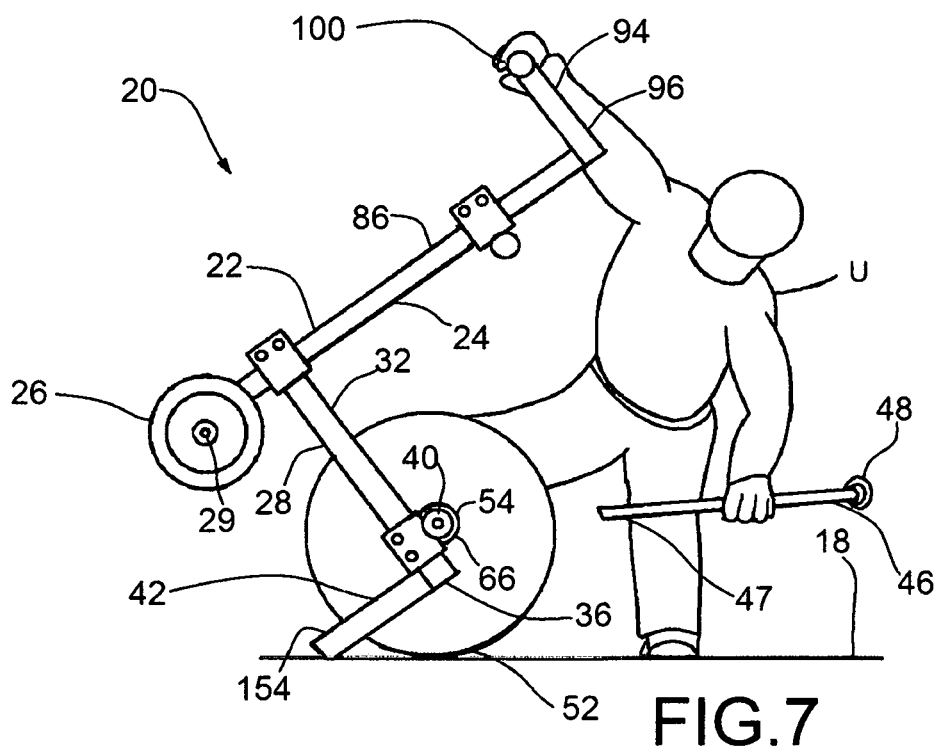
Figure 8:
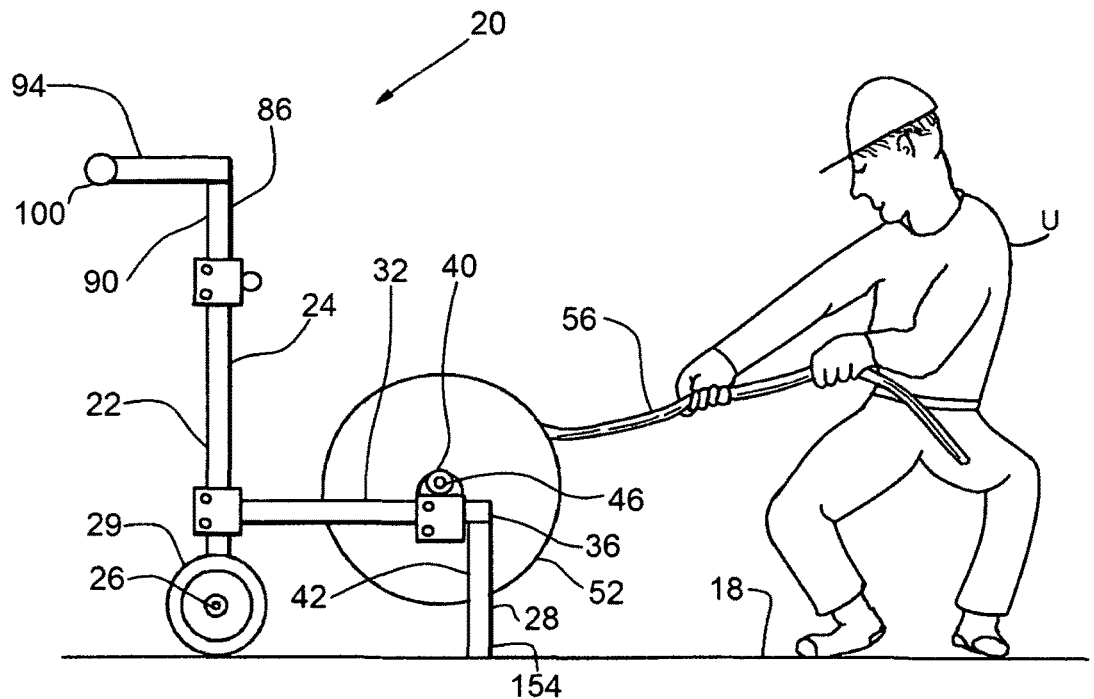

With the axle rod 46 thus secured through the barrel 54 of the spool 52, the cart 20 is returned to its FIG. 5 first position from its FIG. 7 second position as the user U leans, or pivots, the cart 20 rearwardly toward the user U about the lower ends 154, 156 of the struts 42, 44. This action bodily lifts the spool 52 from the floor 18 as the body of the cart 20 acts as a lever which extends between the grips 100, 100 and the lower ends 154, 156 of the struts 42, 44. Once the cart 20 has been returned to its FIG. 5 first position, the spool 52 and its rims 62 are arranged in an elevated condition above the floor 18 as is depicted in FIG. 8 so that the center of gravity of the spool 52 is stably disposed between the wheels 26 and the struts 42, 44 of the cart 20 as a path is traced fore to aft of the cart 20. With the center of gravity of the spool 52 thus stably disposed between the wheels 26 and the struts 42, 44, the spool 52 is held in its FIG. 8 elevated condition above the floor 18 without any need that the cart 20 be held in position by the user U. If desired, the cart 20 can remain in its FIG. 8 position as the material 56 is unwound from the barrel 54 of the spool 52 or as material 56 is wound about the spool barrel 54. It follows that during an operation which involves the winding of a material 56 about the spool barrel 54 or the unwinding of the material 56 from the spool barrel 54, the spool 52 is free to rotate about the axle rod 46 as the axle rod 46 is permitted to rotate within the bearings of the collar portions 164.

Figure 9:
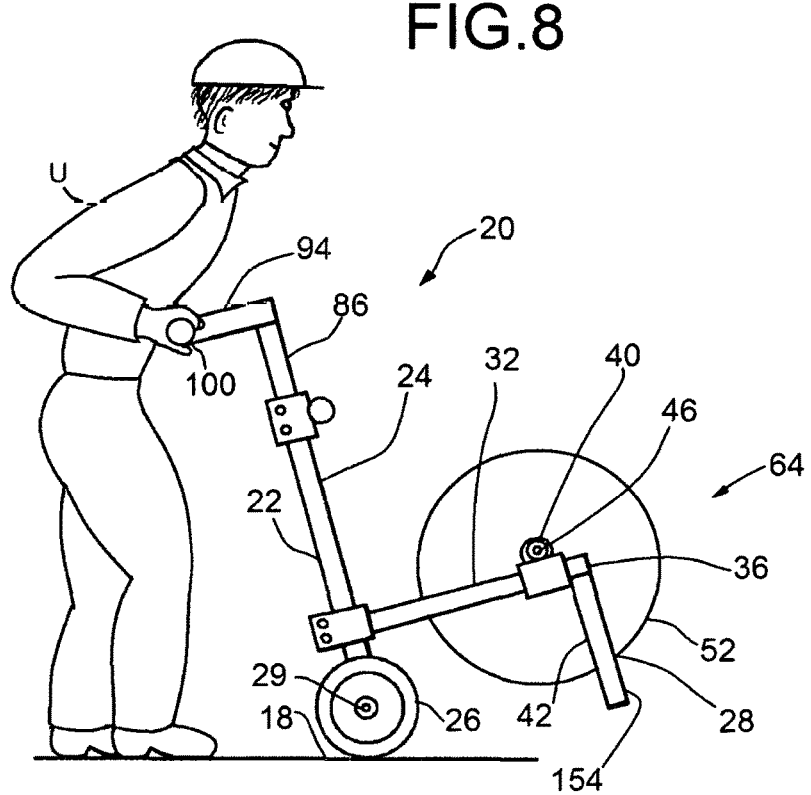

If, on the other hand, the spool 52 is desired to be transported with the cart 20 to an alternative site, the user U re-assumes his position rearwardly of the cart 20, grasps the grips 100 of the handle section 94 and leans, or pivots, the cart 20 rearwardly about the wheels 26, as illustrated in FIG. 9, so that the lower ends 154, 156 of the struts 96 are lifted from the floor 18. In such a leaning action, the body of the cart 20 once again acts as a lever, but in this instance, the wheels 26 provide a fulcrum about which the cart 20 is pivoted. With the cart 20 thus held in its rearwardly-leaning (FIG. 9) position, the spool 52 can be moved to an alternative site as the cart 20 is pushed across the floor 18 with its wheels 26 rollably engaging the floor 18. As is common with two-wheeled hand carts, the movement of the cart 20 across the floor 18 with the spool 52 is facilitated as the user U maintains the center of gravity of the cart 20 and spool 52 as close to vertical alignment with the rotational axis 29 of the wheels 26 as is practical.

Inasmuch as the body of the cart 20 is used as a lever to either lift the spool 52 from the floor 18 to its FIG. 8 elevated position for use or to lift the spool 52 from the floor 18 to its FIG. 9 elevated position to facilitate the transport of the spool 52 between two sites, the disposition of the grips 100 in relation to the remainder of the cart 20 has been found to be advantageous. In this connection and when the cart 20 is positioned in its FIG. 5 first position, the grips 100 are disposed rearwardly of the rotational axis 29 of the wheels 26 by an appreciable extent, and preferably by at least about six inches. This relative disposition between the grips 100 and the remainder of the cart 20 contributes to the overall length of the body of the cart 20 (as measured between the grips 100 and the lower ends 154, 156 of the struts 42, 44) and thereby contributes to the mechanical advantage provided to the user 100 as he grasps the grips 100 and pivots the cart 20 in a desired manner either about the lower ends 154, 156 of the struts 42, 44 or about the wheels 26.

Figure 10:
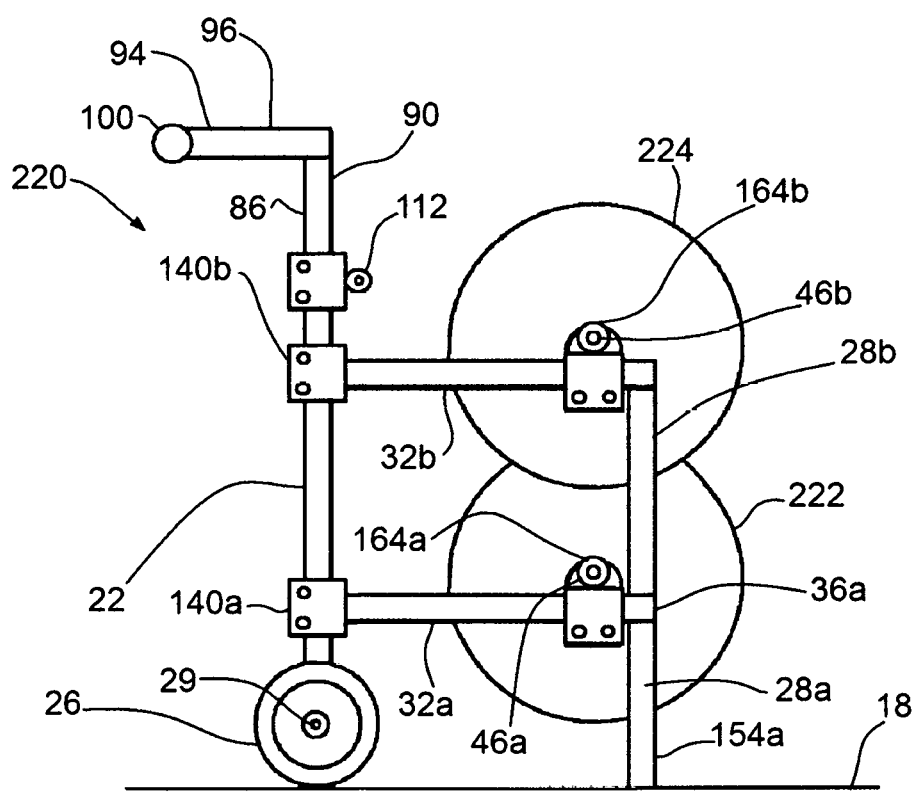
FIG. 10 is a side elevation view of an alternative embodiment of a wheeled hand cart whose components accommodate the support of a plurality of a spools above an underlying floor.
Figure 11:
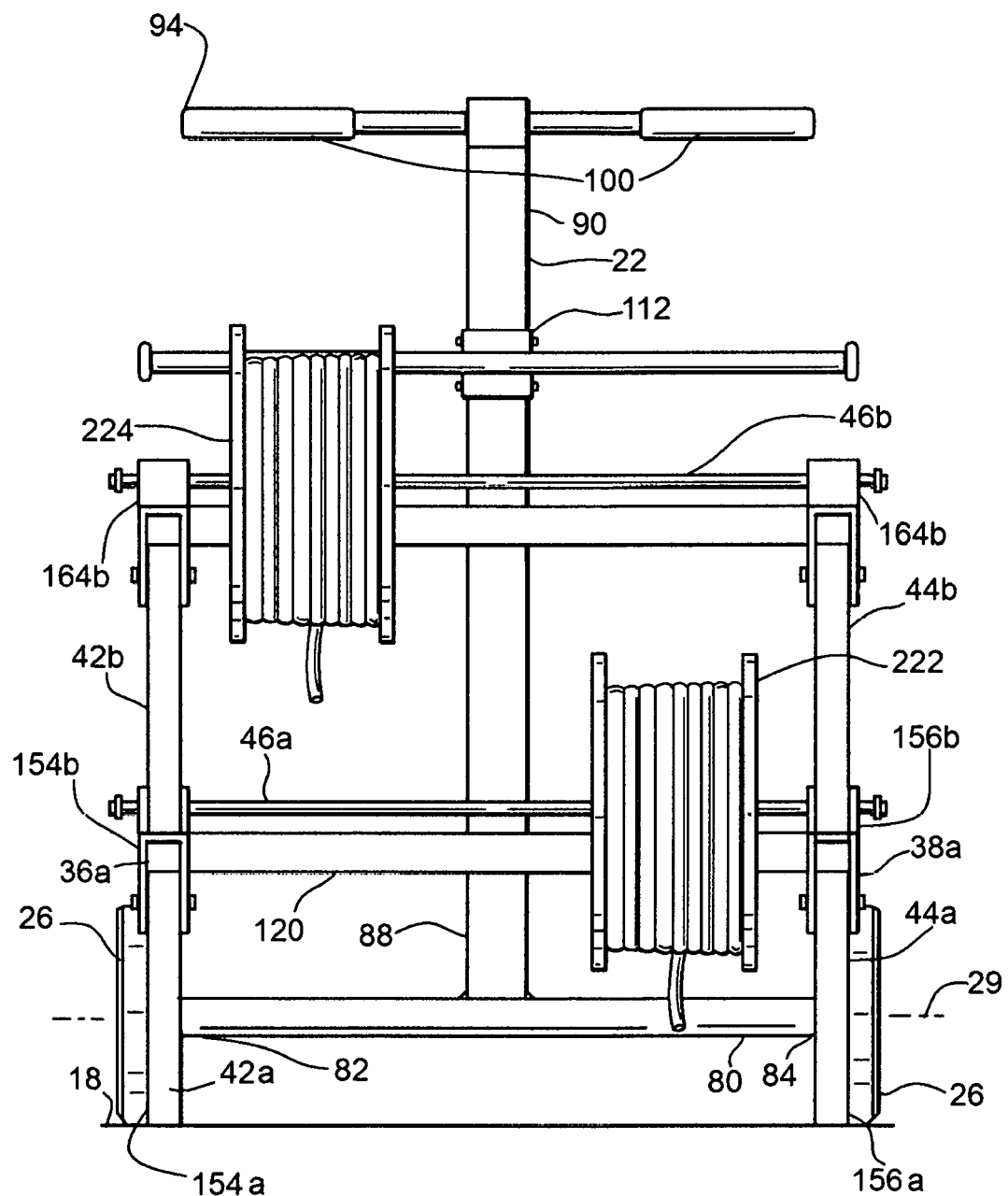
FIG. 11 is a front elevation view of the FIG. 10 embodiment as seen from the right in FIG. 10 and a plurality of spools capable of support by the FIG. 10 embodiment.

With reference to FIGS. 10 and 11, there is illustrated an alternative cart 220 which embodies features of the present invention and which is well-suited for supporting a plurality of spools 222 and 224 in an elevated condition above a floor 18. The cart 220 includes a base 22 which is identical to the base 22 of the cart 20 of FIG. 1 and accordingly, its components bear the same reference numerals. In addition, the cart 220 includes a pair of lower and upper rack sections 28a, 28b, respectively, which are each identical to the rack section 28 of the cart 20 of FIG. 1 and are each secured to the substantially vertically-oriented elongated section 86 of the base 22 of the cart 220 by way of a bracket 140a or 140b.

While the lower rack section 28a of the cart 220 is joined to the elongated section 86 of the base 22 of the cart 220 (by way of the bracket 140a) so that the lower ends 154a, 156a of the struts 42a, 44a engage the floor 18, the upper rack 28b is joined to the elongated section 82 of the base 22 (by way of the bracket 140b) in a superposed relationship with (i.e. above) the lower rack 28a so that the lower ends 154b, 156b of the struts 42b, 44b of the upper rack section 28b rest upon the arm sections 124a, 126a of the lower rack section 28a adjacent the ends 36a, 38b thereof. While the lower rack section 28a is used to support a spool 222 for rotation about an axle rod 46a, the upper rack section 28b is used to support a spool 224 for rotation about an axle rod 46b.

Figure 12:
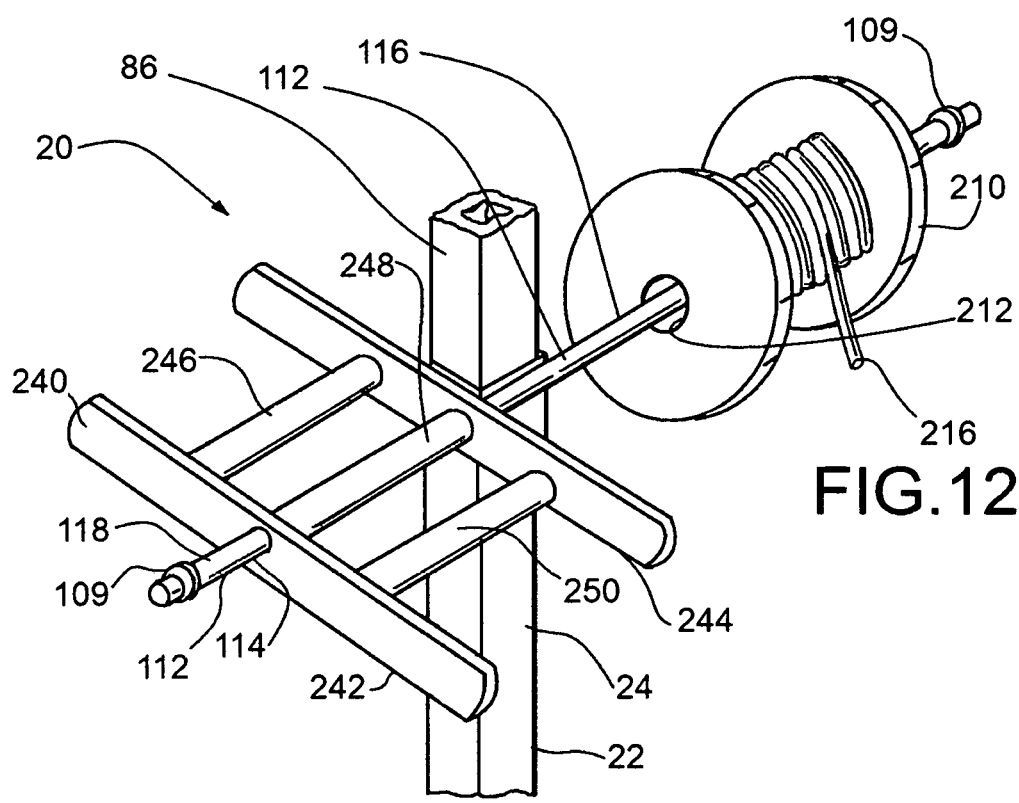
FIG. 12 is a perspective view of a fragment of the cart of FIG. 1 upon which a spool of windable material is supported and upon which a take-up reel accessory is supported.

As suggested earlier and with reference again to the rod assembly 112 of the FIG. 1 cart 20, the rod 114 which is joined to the substantially vertically-disposed elongated section 86 of the base 22 of the cart 20 provides a convenient means from which a spool of windable material can be supported. For example, there is illustrated in FIG. 12 a spool 210 of relatively small diameter whose barrel, indicated 212, is positioned about one end portion 116 of the rod 114. With a spool 212 thus positioned upon the rod end portion 116, a windable material 216 can be wound about the spool barrel 212 or unwound from the spool barrel 212 as the spool 210 is permitted to rotate about the rod end portion 116.

Figure 13:
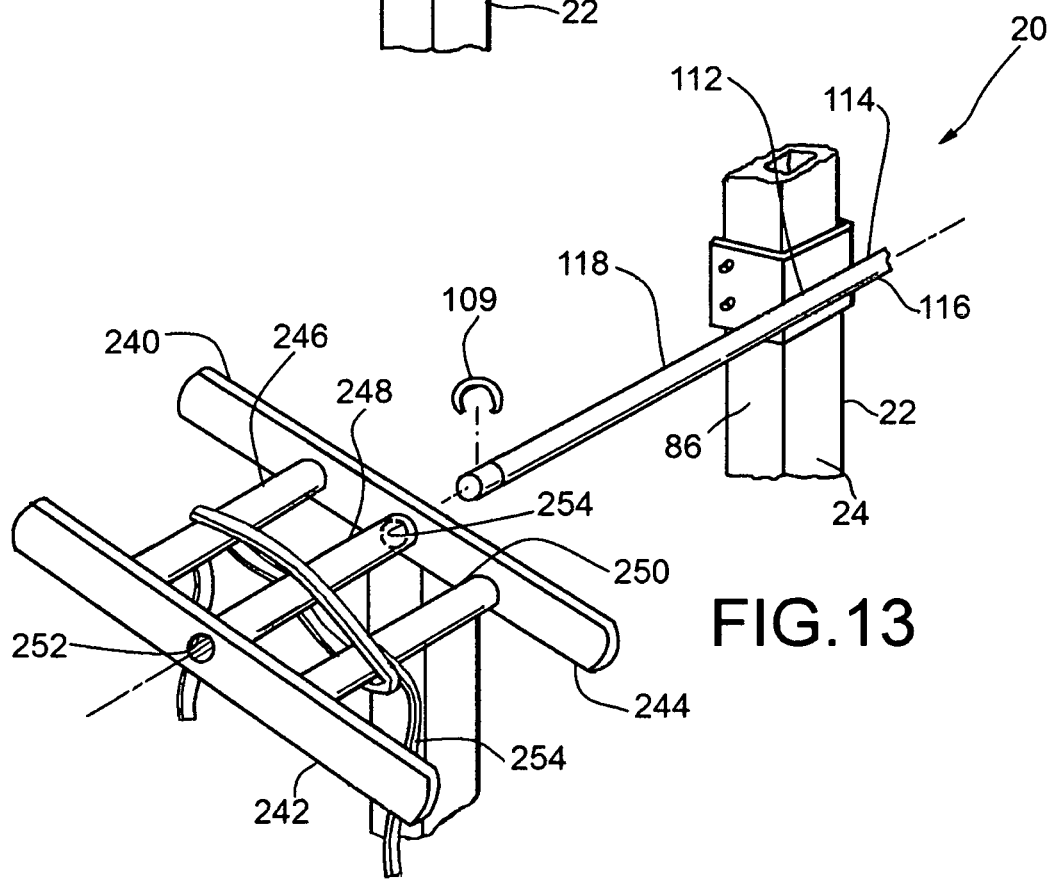
FIG. 13 is a perspective view of the FIG. 12 fragment and take-up reel accessory, shown exploded, and a length of windable material wound about the reel accessory.

Also depicted in FIG. 12, as well as in FIG. 13, is a reel assembly 240 which is positioned about the rod end portion 118 opposite the rod end portion 116 for rotation thereabout. The depicted reel assembly 240 includes a pair of elongated end plates 242, 244 and a plurality of (i.e. three) hollow tubular sections 246, 248, 250 which extend between and are joined (as with welds) to the end plates 242, 244. The tubular sections 246, 248 and 250 are arranged in parallel relationship with one another and the outer tubular sections 246 and 250 are arranged equidistant from the center tubular section 248. Meanwhile, the end plates 242, 244 define axially-aligned openings 252, 254 which, in turn, are defined in the end plates 242 and are axially aligned with the hollow bore of the center tube section 248 to accommodate the endwise placement of the reel assembly 240 about the rod end portion 118. The diameter of the hollow opening of the center tubular section 248 (and the aligned openings 252, 254 of the end plates 242, 244) is slightly larger than that of the rod end portion 118 to permit the reel assembly 240 to be rotated about the rod end portion 118.

When positioned about the rod end portion 118 and secured thereupon with a retaining key 109 positioned about the end of the rod end portion 118, the reel assembly 240 provides an effective means for winding a windable material, such as a wire 254 (FIG. 13), about the outer tubular sections 246, 250 as the reel assembly 240 is rotated about the rod end portion 118.

It follows from the foregoing that a wheeled hand cart 20 has been described which includes a base 22, a rack section 28 which is joined to the base 22 and which includes having a pair of parallel arm sections 124, 126 having spaced-apart ends 36, 38 which extend forwardly of the cart 20 and which are positioned on opposite sides of the item 52 when positioned thereabout for purposes of lifting the item 52 from the underlying floor 18. In addition, the rack section 28 includes a pair of floor-engaging struts 96 which are each joined to a corresponding arm section adjacent the forwardly-extending end thereof so as to extend substantially downwardly therefrom. Cooperating means 64 are also associated with the arm sections 124, 126 of the rack section 28 for cooperating with the barrel 54 of the item 50 to be lifted from the floor 18 so that when the item 50 is supported in an elevated condition above the floor 18 by the hand cart 20, the weight of the item is borne by the cooperating means 64. In addition, the cooperating means 64 is disposed along the length of the arm sections 124, 126 rearwardly of the forwardly-extending ends 36, 38 of the arm sections 124, 126 yet forwardly of the common rotational axis 29 of the wheels 26 of the cart 20.

It also follows that a method of using the hand cart 20 has been described which includes the steps of positioning the hand cart 20 adjacent the item 50 so that the flanges 58, 60 of the item 50 are disposed between the forward-extending arm sections 124, 126 of the rack section 28, then pivoting the cart 20 forwardly about the floor-engaging struts 42, 44 from a first position at which the pair of wheels 26 and the floor-engaging struts 96 engage the floor 18 to a second position at which the wheels 26 are elevated above the floor 18, positioning the cooperating means 64 in cooperating relationship with the barrel 54 of the item 50, and then pivoting the cart 20 rearwardly about the floor-engaging struts 42, 44 to the first position at which the wheels 26 re-engage the floor 18, the item 50 is lifted to an elevated condition above the floor 18.

Figure 14:
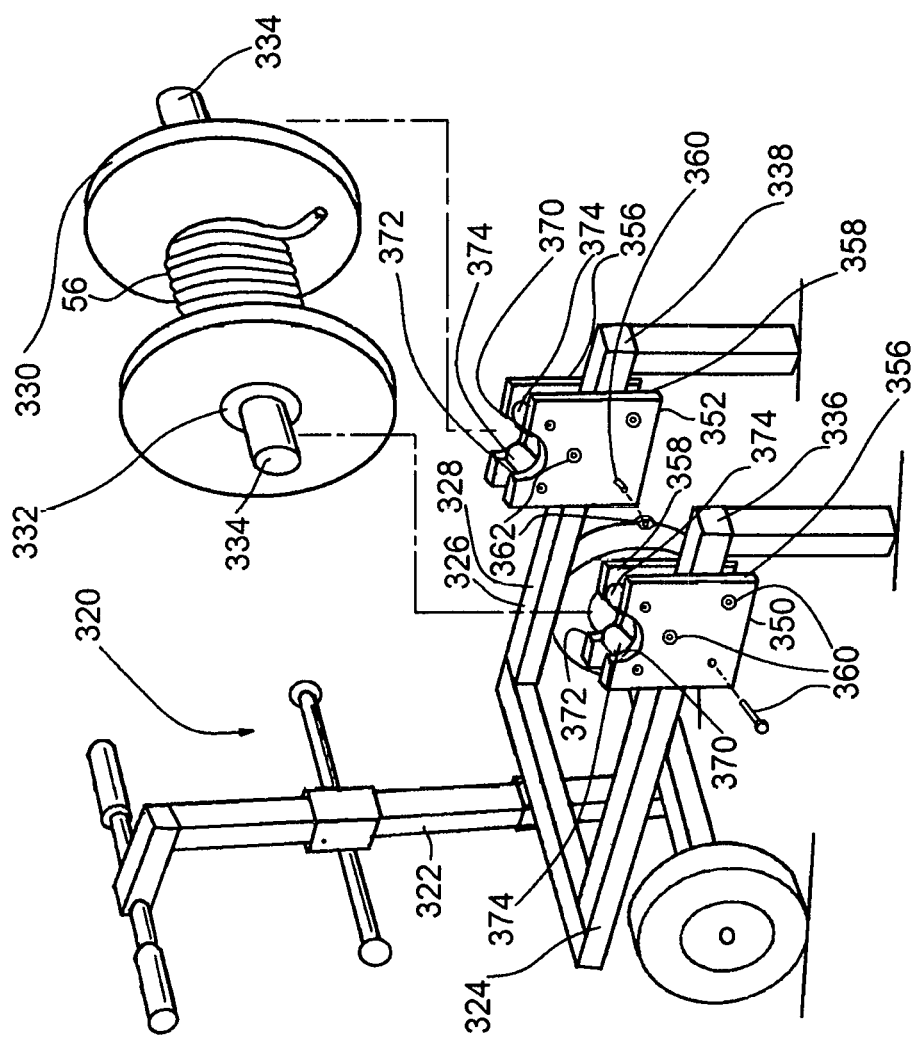
FIG. 14 is a perspective view of one more embodiment of a wheeled hand cart within which features of the present invention are embodied and an exemplary item capable of being lifted and supported above a floor by the FIG. 14 cart.

It will be understood that numerous modifications and substitutions can be had to the aforedescribed embodiment 20 without departing from the spirit of the invention. For example, although the cooperating means 64 of the cart 20 has been shown and described as including pillow blocks 40 and an axle rod 46 for bearing the weight of the spool 52 when the spool 52 is supported by the cart 20, the cooperating means 64 can take any of a number of alternative forms. For example, there is illustrated in FIG. 14 a cart 320 having a base 322, a rack section 328 which includes a pair of parallel arm sections 324, 326 having spaced-apart ends 336, 338 and cooperating means 324 in the form of a pair of cradle assemblies 350, 352 which are mounted upon the arm sections 324, 326 adjacent the ends 336, 338 thereof. As will be apparent herein, the cradle assemblies 350, 352 are well-suited for supporting an item, such as the spool 52 of FIG. 2, having a rod (not shown) which is positioned so as to extend through the hollow bore 66 so that opposite end portions of the rod extend, or protrude, outwardly from the flanges of the item. In such an instance and when the cradle assemblies 350, 352 are positioned in cooperating relationship with the item, the outwardly-protruding end portions of the rod are positioned within and cradled by the cradle assemblies 350, 352.

By way of further example, there is illustrated in FIG. 14 an item 330 having a centrally-disposed barrel 332 about which a windable material 56 is wound and from which cylindrical protuberances 334 extend at each end of the opposite ends of the barrel 332, and each cradle assembly 350 or 352 includes a pair of plates 356, 358 which are each mounted upon a corresponding arm section 324 or 326 with bolts 360 whose shanks extend through aligned openings provided in the plates 356, 358 so that the plates 356, 358 are sandwiched about the corresponding arm section 324 or 326 between the heads of the bolts 360 and nuts 362 which are threadably secured upon the ends of the bolts 360 opposite the heads thereof.

In addition, the pair of plates 356, 358 define aligned, semi-circular-shaped cutouts 370, 372, respectively, and there is associated with each cradle assembly 352, 354 at least two spaced-apart rollers 374 which extend between the plates 356, 358 adjacent the cutouts 370, 372 thereof so that the peripheral surfaces of the rollers 374 extend above, as viewed in FIG. 14, the upper edges of the cutouts 370, 372. When each protuberance 334 of the item 330 is directed sideways into a corresponding pair of cutouts 370, 372 so as to rest across the peripheral surfaces of the rollers 374, each protuberance 334 is cradled by the corresponding cradle assembly 350 or 352. When cradled by a corresponding cradle assembly 350, 352, each protuberance 334, as well as the associated item 330, is free to rotate about its longitudinal axis by way of the pair of rollers 374 between which the protuberance 334 is captured.

It follows that the step of maneuvering the cooperating means 324 of the FIG. 14 cart 320 into cooperating relationship with the protuberances 334 associated with the opposite ends of the item 330 involves the manipulation of the cart 320 relative to the item 330 so that the cutouts 370, 372 of the cradle assemblies 352, 354 nestingly accept the protuberances 334 beneath which the cradle assemblies 352, 354 are arranged so that the cradle assemblies 352, 354 are in position to support the item 330 when the protuberances 334 are accepted by the cutouts 370, 372. In other words, the cradle assemblies 352, 354 are capable of cradling the protuberances 334 whether the cart 330 is canted forwardly relative to the underling floor about its rack section 328 (n a manner resembling the FIG. 7 disposition of the cart relative to the item to be lifted) in order to place the cradle assemblies 352, 354 into an initial cooperating relationship with the protuberances 334 or whether the cart 330 is subsequently returned to an original, or first (FIG. 14), position at which the entire weight of the protuberances 334 is borne by the cradle assemblies 352, 354.

Accordingly, the aforedescribed embodiment 20 is intended for the purpose of illustration and not as limitation.

The invention claimed is:

1. A hand cart for lifting an item for holding windable material from an underlying floor wherein the item includes an elongated barrel having two opposite ends and about which the material is wound and the item is arranged so that the barrel of the item is oriented substantially parallel to the floor, said hand cart comprising:

a base including a first elongated section which is arranged substantially horizontally and which includes two opposite ends and a second elongated section which includes two opposite upper and lower ends, and wherein the lower end of the second elongated section is joined to the first elongated section at a location therealong which is disposed substantially midway between the two opposite ends of the first elongated section, and the second elongated section is arranged with respect to the first elongated section so that the upper end of the second elongated section is directed substantially upwardly from the first elongated section, and the base also includes at least one hand grip which is associated with the other of the two opposite ends of the second elongated section;

a pair of floor-engaging wheels which are supported at the opposite ends of the first elongated section of the base for rotation relative thereto about a common rotational axis;

an item-supporting rack section which is joined to the base and which includes a pair of substantially parallel arm sections, wherein each arm section has an end which extends forwardly of the cart, and the item-supporting rack section further includes a pair of floor-engaging struts which are each joined to a corresponding arm section adjacent the forwardly-extending end thereof so as to extend substantially downwardly therefrom; and cooperating means associated with the arm sections of the item-supporting rack section for cooperating with the barrel of the item so that when the item is supported in an elevated condition above the floor by the hand cart, the weight of the item is borne by the cooperating means, and wherein the cooperating means is disposed along the length of the arm sections rearwardly of the forwardly-extending ends of the arm sections yet forwardly of the common rotational axis of the wheels of the cart, and the cooperating means is disposed at a higher elevation from the floor than is the barrel of the item desired to be lifted with the cart so that by positioning the cart adjacent the item so that the barrel of the item extends between the arm sections of the item-supporting rack section, then pivoting the cart forwardly about the floor-engaging struts from a first position at which the wheels and the floor-engaging struts engage the floor to a second position at which the wheels are elevated from the floor, positioning the cooperating means in cooperating relationship with the barrel of the item, and then pivoting the cart rearwardly about the floor-engaging struts to the first position at which the wheels re-engage the floor, the item is lifted to an elevated condition above the floor.

2. The hand cart as defined in claim 1 wherein the elongated barrel of the item is hollow, and the cooperating means includes a member which is associated with each arm section and which defines an opening, and the members of the cooperating means are arranged upon the arm sections so that the openings thereof are axially aligned with one another, and the cooperating means further includes an axle rod which is positionable through the aligned openings of the members so that when the cart is pivoted into its second position, the openings of the members are axially aligned with the hollow barrel of the item so that by pivoting the cart to the second position and inserting the axle rod in sequence through the opening of one of the members, through the hollow elongated barrel of the item and then through the opening of the other of the members and subsequently returning the cart to the first position, the item is lifted to an elevated condition above the floor by way of the axle rod.

3. The hand cart as defined in claim 2 wherein each member of the cooperating means includes a pillow block which is secured to a corresponding arm section, and each pillow block includes an opening which opens laterally of the cart and is axially aligned with the laterally-opening opening of the pillow block of the other member.

4. The hand cart as defined in claim 3 wherein each pillow block is releasably secured to the corresponding arm section to accommodate an adjustment in the position of the pillow block along the length of the arm section.

5. The hand cart as defined in claim 1 wherein the at least one hand grip is arranged in such a relationship to the wheels so that when the cart is positioned in the first position, the at least one hand grip is disposed rearwardly of the common rotational axis of the wheels.

6. The hand cart as defined in claim 5 wherein the at least one hand grip is disposed at least about six inches rearwardly of the common rotational axis of the wheels.

7. The hand cart as defined in claim 1 further including a horizontally-extending elongated section which is interposed between the at least one hand grip and the second elongated section of the base adjacent the upper end of the second elongated section.

8. The hand cart as defined in claim 1 further comprising an elongated rod having two opposite end portions and which is attached to the second elongated section of the base so that the opposite end portions of the rod extend from the opposite sides of the base.

9. A hand cart for lifting an item for holding windable material from an underlying floor wherein the item includes an elongated barrel having two opposite ends and about which the material is wound and two flanges wherein the two flanges are disposed at the opposite ends of the barrel and each flange has a rim along the periphery thereof and the item is arranged so that the rims of both flanges engage an underlying floor and the barrel of the item is oriented substantially parallel to the floor, said hand cart comprising:
  a base including a first elongated section which is arranged substantially horizontally and which includes two opposite ends and a second elongated section which includes two opposite upper and lower ends, and wherein the lower end of the second elongated section is joined to the first elongated section at a location therealong which is disposed substantially midway between the two opposite ends of the first elongated section, and the second elongated section is arranged with respect to the first elongated section so that the upper end of the second elongated section is directed substantially upwardly from the first elongated section, and the base also includes at least one hand grip which is associated with the other of the two opposite ends of the second elongated section;
  a pair of floor-engaging wheels which are supported at the opposite ends of the first elongated section of the base for rotation relative thereto about a common rotational axis;
  an item-supporting rack section including a substantially U-shaped portion which includes a pair of substantially parallel arm sections and a base section to which the parallel arm sections are joined, and the base section of the U-shaped portion of the item-supporting rack section is joined to the second elongated section of the base to thereby secure the item-supporting rack section to the base;
  wherein each arm section has an end which extends forwardly of the cart, and the item-supporting rack section further includes a pair of floor-engaging struts which are each joined to a corresponding arm section adjacent the forwardly-extending end thereof so as to extend substantially downwardly therefrom;
  a pair of pillow blocks which are mounted upon the arm sections of the item-supporting rack section and which define openings which are axially aligned with one another and are disposed along the length of the arm sections rearwardly of the forwardly-extending ends of the arm sections yet forwardly of the common rotational axis of the wheels of the cart, and the axially-aligned openings of the pillow blocks are disposed at a higher elevation than is the barrel of the item desired to be lifted with the cart; and
  an axle rod which is positionable through the aligned openings of the pillow blocks
  so that by positioning the cart adjacent the item so that the flanges of the item are disposed between the arm sections of the item-supporting rack section, then pivoting the cart forwardly about the floor-engaging struts from a first position at which the wheels and the floor-engaging struts engage the floor to a second position at which the wheels are elevated from the floor and the barrel of the item is axially aligned with the openings of the pillow blocks so that upon subsequently pivoting the cart to its second position and inserting the axle rod in sequence through the opening of one of the pairs of pillow blocks, through the hollow elongated barrel of the item and then through the opening of the other of the pair of pillow blocks, and then returning the cart to the first position, the item is lifted to an elevated condition above the floor by way of the axle rod.

10. The hand cart as defined in claim 9 wherein each pillow block is releasably secured to the corresponding arm section to accommodate an adjustment in the position of the pillow block along the length of the arm section.

11. The hand cart as defined in claim 9 wherein the at least one hand grip is arranged in such a relationship to the wheels so that when the cart is positioned in the first position, the at least one hand grip is disposed rearwardly of the common rotational axis of the wheels.

12. The hand cart as defined in claim 9 further comprising an elongated rod having two opposite end portions and which is attached to the second elongated section of the base so that the opposite end portions of the rod extend from the opposite sides of the base.

13. The hand cart as defined in claim 12 wherein the item-supporting rack section is a first item-supporting rack section and the cart further including a second item-supporting rack section which is identical in construction to that of the first item-supporting rack section and is securable to the second elongated section of the base in a superposed relationship with the first item-supporting rack section.

14. A hand cart for lifting an item for holding windable material from an underlying floor wherein the item includes an elongated barrel having two opposite ends and about which the material is wound and two flanges wherein the two flanges are disposed at the opposite ends of the barrel and each flange has a rim along the periphery thereof and the item is arranged so that the rims of both flanges engage an underlying floor and the barrel of the item is oriented substantially parallel to the floor, and wherein there is associated with the elongated barrel of the item a protuberance member which protrudes axially from each of the two opposite ends of the barrel and from which the item can be lifted from the underlying floor, said hand cart comprising:
  a base including a first elongated section which is arranged substantially horizontally and which includes two opposite ends and a second elongated section which includes two opposite upper and lower ends, and wherein the lower end of the second elongated section is joined to the first elongated section at a location therealong which is disposed substantially midway between the two opposite ends of the first elongated section, and the second elongated section is arranged with respect to the first elongated section so that the upper end of the second elongated section is directed substantially upwardly from the first elongated section, and the base also includes at least one hand grip which is associated with the other of the two opposite ends of the second elongated section;

a pair of floor-engaging wheels which are supported at the opposite ends of the first elongated section of the base for rotation relative thereto about a common rotational axis;

an item-supporting rack section including a substantially U-shaped portion which includes a pair of substantially parallel arm sections and a base section to which the parallel arm sections are joined, and the base section of the U-shaped portion of the item-supporting rack section is joined to the second elongated section of the base to thereby secure the item-supporting rack section to the base;

wherein each arm section has an end which extends forwardly of the cart, and the item-supporting rack section further includes a pair of floor-engaging struts which are each joined to a corresponding arm section adjacent the forwardly-extending end thereof so as to extend substantially downwardly therefrom;

a pair of cradle assemblies which are mounted upon the arm sections of the item-supporting rack section and wherein each cradle assembly includes a bracket which is adapted to accept a protuberance member associated with a corresponding end of the two opposite ends of the elongated barrel of the item so that when the item is supported by the hand cart, the bracket acts as a cradle within which the protuberance member is accepted so that by positioning the cart adjacent the item so that the flanges of the item are disposed between the arm sections of the item-supporting rack section, then pivoting the cart forwardly about the floor-engaging struts from a first position at which the wheels and the floor-engaging struts engage the floor to a second position at which the wheels are elevated from the floor and the protuberance members of the item are accepted by the brackets of the cradle assemblies and then returning the cart to the first position, the item is lifted to an elevated condition above the floor by way of the cradle assemblies.

15. A method of lifting an item for holding windable material from an underlying floor wherein the item includes an elongated barrel having two opposite ends and about which the material is wound and wherein the item is arranged so that the barrel of the item is oriented substantially parallel to the floor, said method comprising the steps of:

providing a hand cart including a) a base including a first elongated section which is arranged substantially horizontally and which includes two opposite ends and a second elongated section which includes two opposite upper and lower ends, and wherein the lower end of the second elongated section is joined to the first elongated section at a location therealong which is disposed substantially midway between the two opposite ends of the first elongated section, and the second elongated section is arranged with respect to the first elongated section so that the upper end of the second elongated section is directed substantially upwardly from the first elongated section, and the base also includes at least one hand grip which is associated with the other of the two opposite ends of the second elongated section;

b) a pair of floor-engaging wheels which are supported at the opposite ends of the first elongated section of the base for rotation relative thereto about a common rotational axis;

c) an item-supporting rack section which is joined to the base and which includes a pair of substantially parallel arm sections, wherein each arm section has an end which extends forwardly of the cart, and the item-supporting rack section further includes a pair of floor-engaging struts which are each joined to a corresponding arm section adjacent the forwardly-extending end thereof so as to extend substantially downwardly therefrom; and d) cooperating means associated with the arm sections of the item-supporting rack section for cooperating with the barrel of the item so that when the item is supported in an elevated condition above the floor by the hand cart, the weight of the item is borne by the cooperating means, and wherein the cooperating means is disposed along the length of the arm sections rearwardly of the forwardly-extending ends of the arm sections yet forwardly of the common rotational axis of the wheels of the cart, and the cooperating means is disposed at a higher elevation from the floor than is the barrel of the item desired to be lifted with the cart;

positioning the cart adjacent the item so that the barrel of the item extends between the arm sections of the item-supporting rack section;

pivoting the cart forwardly about the floor-engaging struts from a first position at which the wheels and the floor-engaging struts engage the floor to a second position at which the wheels are elevated from the floor;

positioning the cooperating means in cooperating relationship with the barrel of the item, and then pivoting the cart rearwardly about the floor-engaging struts to the first position at which the wheels re-engage the floor and so that the item is lifted to an elevated condition above the floor.

16. The method as defined in claim 15 wherein the elongated barrel of the item desired to be lifted is hollow, the cooperating means includes a member which is associated with each arm section and which defines an opening, and the members of the cooperating means are arranged upon the arm sections so that the openings thereof are axially aligned with one another, and the cooperating means further includes an axle rod which is positionable through the axially-aligned openings of the members, and the step of positioning the cooperating means in cooperating relationship with the barrel of the item includes the step of inserting the axle rod in sequence through the opening of one of the members, through the hollow elongated barrel of the item and then through the opening of the other of the members so that upon subsequently returning the cart to the first position, the item is lifted to an elevated condition above the floor by way of the axle rod.

* * * * *